US006412749B1

(12) United States Patent
Supinski et al.

(10) Patent No.: US 6,412,749 B1
(45) Date of Patent: Jul. 2, 2002

(54) BRACKET FOR MOUNTING AN EXPANSION CARD AND METHOD THEREFORE

(75) Inventors: Mark B. Supinski, Keswick; Henry Quan, Woodbridge, both of (CA)

(73) Assignee: ATI Technologies, Inc., Thornhill (CA)

( * ) Notice: Subject to any disclaimer, the term of this patent is extended or adjusted under 35 U.S.C. 154(b) by 141 days.

(21) Appl. No.: 09/069,907

(22) Filed: Apr. 30, 1998

(51) Int. Cl.[7] .................................................. F16M 1/00
(52) U.S. Cl. ...................................... 248/674; 361/825
(58) Field of Search ............................... 248/674, 200, 248/300; 361/684, 825, 807, 809, 810

(56) References Cited

U.S. PATENT DOCUMENTS

| 4,745,524 A | * | 5/1988 | Patton, III | 361/399 |
| 4,924,355 A | * | 5/1990 | Mitchell et al. | 361/415 |
| 4,987,517 A | * | 1/1991 | Kurz | 361/417 |
| 5,463,532 A | * | 10/1995 | Petitpierre et al. | 361/800 |
| 5,491,613 A | * | 2/1996 | Petitpierre | 361/800 |
| 5,679,923 A | * | 10/1997 | Le | 174/435 |
| 5,986,892 A | * | 11/1999 | Hargy, III | 361/759 |

* cited by examiner

*Primary Examiner*—Leslie A. Braun
*Assistant Examiner*—Gwendolyn Baxter
(74) *Attorney, Agent, or Firm*—Vedder, Price, Kaufman & Kammholz

(57) ABSTRACT

An expansion card bracket and a method for manufacturing and utilizing the expansion card bracket. The bracket includes a primary surface that is adapted for mounting the bracket into a computer chassis. The primary surface is complemented with an appendage that extends rearward from the rear face of the primary surface. The appendage is formed such that it attaches to the expansion card at a recessed point and provides support to the primary surface of the bracket.

19 Claims, 5 Drawing Sheets

BRACKET FOR MOUNTING AN EXPANSION CARD AND METHOD THEREFORE

FIELD OF THE INVENTION

The invention relates generally to brackets and more particularly to a bracket for mounting an expansion card into a computer chassis.

BACKGROUND OF THE INVENTION

Computers are used for many purposes. In order to increase their potential capabilities, computers are often equipped with expansion slots. Expansion slots allow expansion cards to be inserted into the computer such that the circuitry of the cards becomes part of the overall computer system. Expansion cards can add such things as more memory, specialized interfaces for the control or monitoring of external equipment, circuitry for improved sound, circuitry for data communications, and many other capabilities that can be desirous in various applications. In order to add an expansion card to a system, the card is typically inserted into an expansion slot and then mounted to the chassis of the computer with a mounting bracket. The mounting bracket typically couples to the rear of the computer chassis, and may include apertures for allowing connections to the expansion card from external to the chassis.

As technology continues to evolve, computers progress to new and different designs. One of the challenges of producing expansion cards is making them compatible with as many different computer designs as possible. Computer manufacturers often standardize certain aspects of the expansion slots such that interoperability of expansion cards is encouraged. For example, the connectivity of the expansion slots can be standardized in terms of the number of pins and the ordering of the pins. The maximum physical dimensions and power consumption expansion cards are also often standardized.

A particular problem is presented when the standard maximum size of an expansion card is reduced. When the size of a computer chassis is reduced in terms of height, the maximum height of expansion cards is also reduced. Thus, older cards designed for the larger chassis are not compatible with the reduced-height systems. However, if the expansion slots in the reduced-height systems retain the same physical dimensions and electrical characteristics, shorter cards designed for the reduced-height systems can be used in those with the older, larger chassis design.

The ATX and NLX motherboard form-factor specifications describe the mechanical and electrical specifications for building a motherboard and the design considerations to develop a chassis to house the motherboard. The ATX form-factor is older and has larger dimensions. The NLX form-factor is the more recently introduced of the two and is designed for reduced height expansion cards. Many ATX form-factor machines continue to be used and built, and it is desirable for NLX form-factor expansion cards to be functional in older ATX systems.

Consequently, a need exists for a bracket that promotes interoperability of expansion cards in a cost-efficient, effective manner.

DETAILED DESCRIPTION OF A PREFERRED EMBODIMENT OF THE INVENTION

Generally, the present invention provides for an expansion card bracket and a method for manufacturing and utilizing the expansion card bracket. The bracket includes a primary surface that is adapted for mounting the bracket into a computer chassis. The primary surface is complemented with an appendage that extends rearward from the rear face of the primary surface. The appendage is formed such that it attaches to the expansion card at a recessed point and provides support to the primary surface of the bracket such that the bracket can resist bending or other forms of disfigurement that could result in the bracket requiring replacement. With such a bracket and related method, an expansion card can be mounted into a computer chassis more reliably and cheaply than can be done with brackets that are susceptible to bending or other forms of disfigurement.

Figure 1:
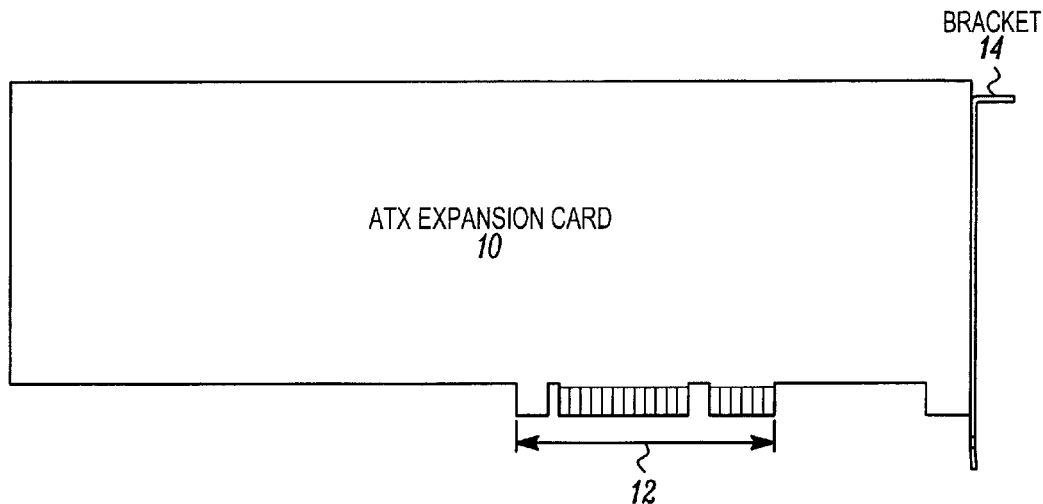
FIG. 1 illustrates an ATX expansion card coupled to an ATX-compatible bracket.

FIG. 1 illustrates a prior art ATX expansion card 10 and a bracket 14 for mounting into an ATX style chassis. The ATX chassis is a large chassis that can accommodate cards that are approximately 4.25 inches in height. The ATX expansion card 10 includes a connector 12 that couples to the expansion slot in.:the computer. The bracket 14 mounts to the chassis of the computer, holding the expansion card 10 in place.

Figure 2:
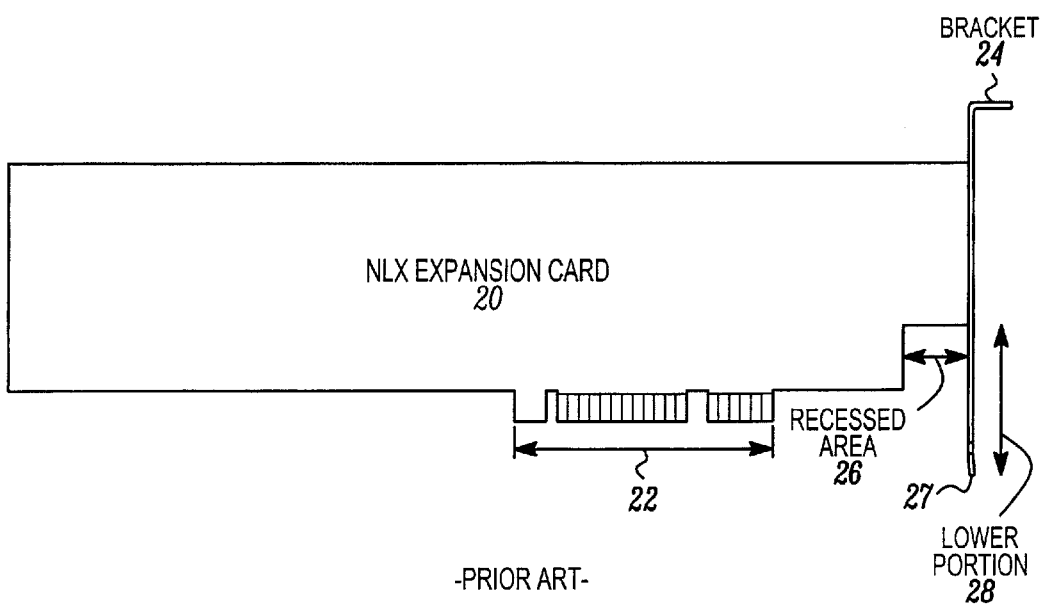
FIG. 2 illustrates an NLX expansion card coupled to an ATX-compatible bracket.

FIG. 2 illustrates prior art NLX expansion card 20 and a bracket 24. The connector 22 of the NLX expansion card has the same pinout as the connector 12 of the ATX expansion card 10. The NLX chassis is shorter than the ATX chassis, which has been the predominate chassis in the industry. However, because the pinout of the connectors 12 and 22 are the same, cards designed to work in an NLX chassis can be used in an ATX chassis, but different mounting brackets are required for proper mounting into the ATX system. The bracket 24 allows the NLX card 20 to be mounted into an ATX chassis.

Mounting bracket 24 includes a lower portion 28 which is not positioned flush with the card 20. NLX cards include a recessed area 26 at the bottom of the card 20 where, in an ATX system, the card is typically flush with the mounting bracket The mounting brackets used with NLX cards in ATX systems retain the general shape of an ATX mounting bracket, and there is an aperture in the rear of the computer chassis that it covered by the bracket. In addition to this, the bottom end 27 of the bracket,24 is used to couple the bracket to the base of the computer chassis or to the motherboard of the computer, thus providing additional support for the mounting bracket. For these reasons, eliminating the lower portion 28 of the bracket is not feasible.

Once the mounting bracket 24 has been affixed to the card 20, the lower portion 28 of the bracket 24 can be inadvertently struck or pressed against which can result in bending or other deformities. Deformed brackets must often be replaced or repaired, thus increasing costs and decreasing productivity.

Figure 3:
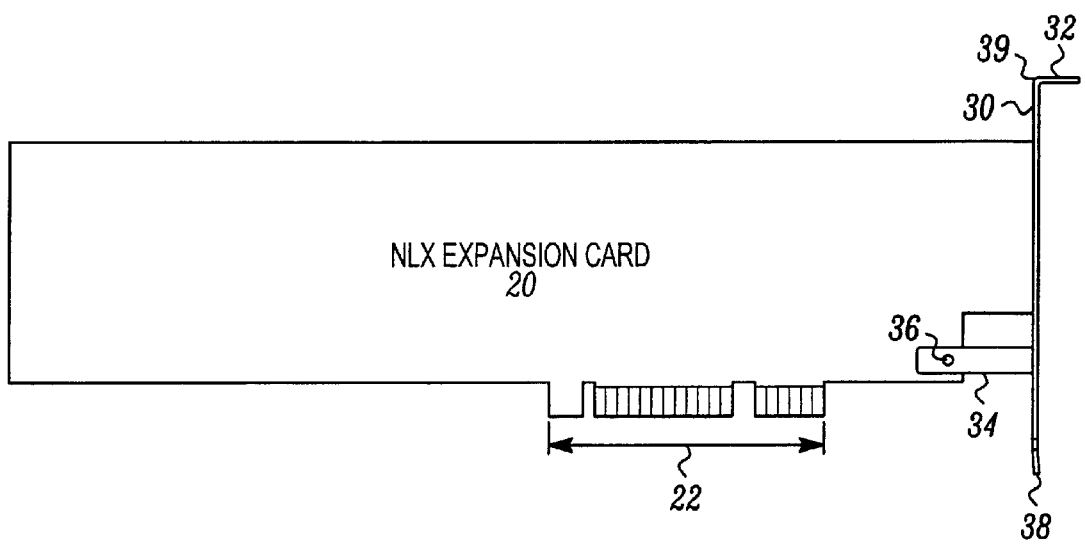
FIG. 3 illustrates an NLX expansion card coupled to an ATX-compatible bracket in accordance with the present invention.
Figure 6:
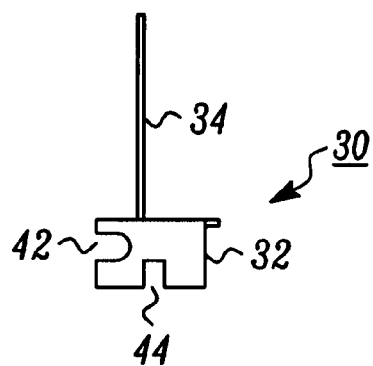
FIG. 6 illustrates yet another perspective view of a bracket in accordance with the present invention.
Figure 5:
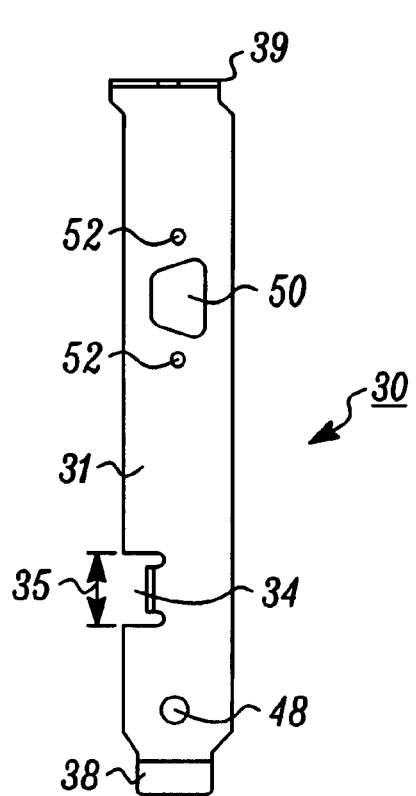
FIG. 5 illustrates another perspective view of a bracket in accordance with the present invention.
Figure 4:
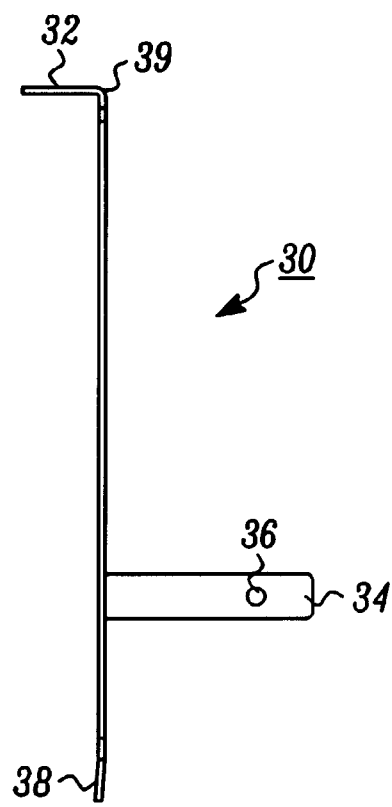
FIG. 4 illustrates a perspective view of a bracket in accordance with the present invention.
Figure 7:
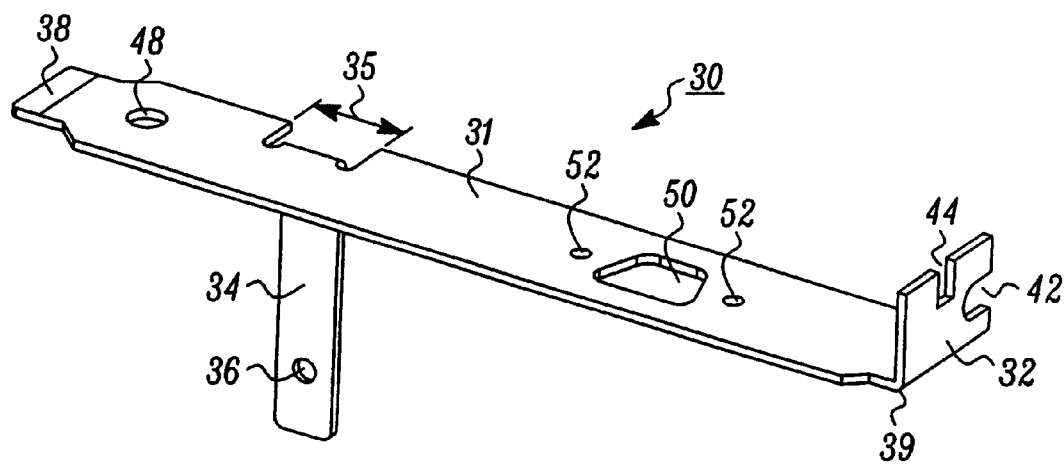
FIG. 7 illustrates yet another perspective view of a bracket in accordance with the present invention.
Figure 8:
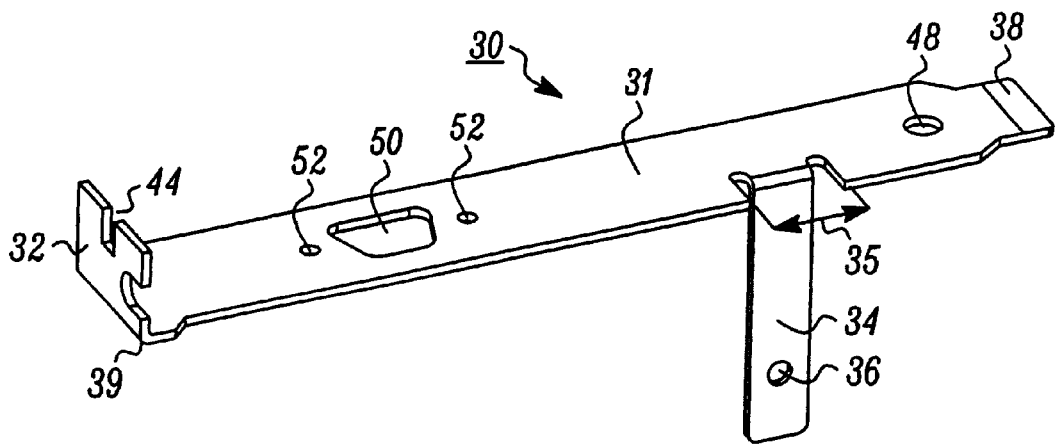
FIG. 8 illustrates yet another perspective view of a bracket in accordance with the present invention.

FIG. 3 illustrates an NLX card 20 with a mounting bracket 30 which is less-likely to suffer from force applied in the area of the bracket 30 which is not flush with the NLX card 20. The bracket 30 includes appendage 34 which serves to anchor the lower portion of the bracket to the expansion card 20 which makes the bracket 30 more resistant to applied forces.

FIGS. 4–8 illustrate various perspectives of the bracket 30, which has a primary surface 31 and an appendage 34. The primary surface 31 has a rear face and a front face and extends between a top end 39 and a bottom end 38. The primary surface 31 is adapted to be aligned against a surface of the computer chassis, where the surface may be the surface at the rear of the chassis which includes apertures designed to accommodate expansion cards and their external connectivity needs. The bracket 30 may be designed such that the primary surface 31 fits flush against one of the apertures in the rear of the chassis such that no unwanted openings remain uncovered. The generally-rectangular, planar surface illustrated in FIGS. 4–8 is adapted to fit into IBM PC compatible computers.

The appendage 34 extends outward from the rear face of the primary surface 31 and has a proximal end at the rear face and a distal end opposite the proximal end. -The distal end of the appendage 34 is adapted for coupling the first appendage to the expansion card. In one embodiment, the distal end includes a screw hole 36 that allows the appendage 34 to mount to the expansion card via a screw. The screw hole 36 can be positioned at any point on the appendage 34 that facilitates coupling to the expansion card. Similarly, in other embodiments, the position of the appendage 34 can be modified in relation to the primary surface 31 to accommodate variations in expansion card designs. It should be obvious to one skilled in the art that there are numerous other mechanisms for coupling the appendage 34 to the expansion card. These include a snap-type connector on the appendage 34 that snaps to the expansion card, and an embodiment where the distal end is adapted for insertion into a slot or similar anchoring mechanism on the expansion card.

Preferably, the appendage 34 is positioned such that it extends nearly perpendicular to the primary surface 31. This angle allows for the appendage 34 to couple with the expansion card and provide support to the primary surface 31. The appendage 34 may also be positioned such that it extends from one of the sides of the primary surface 31. The primary advantage to this is in the manufacturing of the bracket 30, and it should be understood that other positions for the appendage 34 are possible which will also provide support to the primary surface 31. The appendage 34 may also be positioned along the side of the primary surface 31 within a recessed notch, which keeps the appendage 34 from extending beyond the side of the primary surface 31.

The appendage 34, which may also be a generally rectangular planar surface, is positioned along the side of the primary surface 31 a predetermined distance from the top end 39 of the primary surface 31 such that it is able to couple to the recessed portion of the expansion card. In a particular embodiment, the distance from the top end 39 to the center of the appendage 34 is 3.375 inches, the length of the primary surface 31 is 4.725 inches, and the length of the appendage 34 is 1.43 inches. These dimensions allow the bracket 30 to couple to an NLX expansion card for mounting into an ATX chassis.

The bottom end 38 of the primary surface 31 is adapted for mounting the bracket 30 to a base portion of the computer chassis, where the base is typically the portion of the chassis in which the motherboard is positioned. The primary surface 31 of the bracket 30 may also include one or more apertures that allow connectors of the expansion card to be accessible from outside of the computer chassis. Aperture 50 allows for such access to a connector. The connector of the expansion card can be coupled to the bracket using screws inserted through screw holes 52. In this way, the bracket 30 can be strongly affixed to the expansion card.

In the preferred embodiment, the bracket 30 also includes a second appendage 32 that extends outward from the front face of the primary surface 31 at the top end 39.of the bracket 30. The appendage 32 is adapted for coupling the bracket 30 to the computer chassis, and may include a notched area 42 that allows for coupling to the chassis with a screw or similar connector. The appendage 32 may also include a notched area 44 that helps align the bracket within the chassis.

The bracket 30 may be made from a single piece of metal. In the preferred embodiment, the bracket is made from 0.034 inch thick (20 gauge) cold-rolled steel that is zinc plated. A predetermined shape is stamped out of a flat piece of metal and then a bend is formed at the proximal end of the first appendage such that it extends outward from the rear face of the primary surface 31. Similarly, the appendage 32 can be formed by bending another appendage of the predetermined shape to the proper angle.

Figure 9:
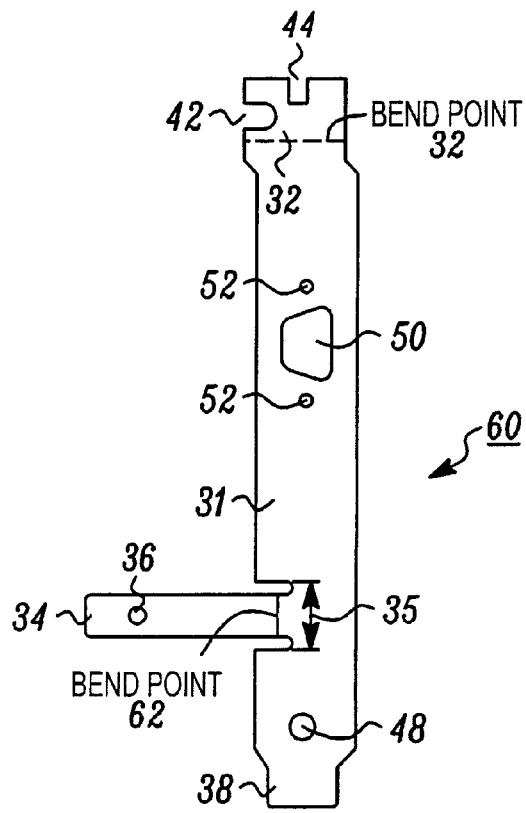
FIG. 9 illustrate a form that is used to produce a bracket in accordance with the present invention.

FIG. 9 illustrates a predetermined shape 60 that can be stamped or cut from a piece of material, which may be metal or another pliable material, and manipulated to form a bracket 30. The predetermined shape 60 includes bend points 62 and 64 positioned where the appendages 34 and 32 meet the primary surface 31.

Figure 10:
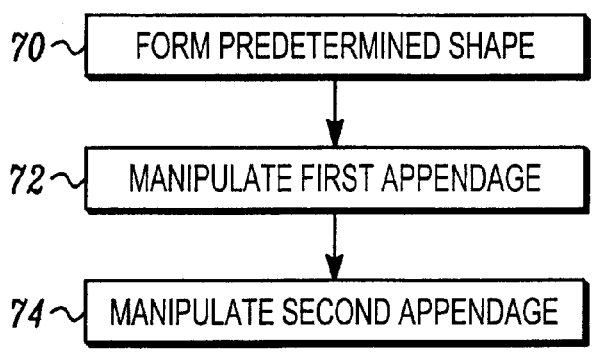
FIG. 10 illustrates a flow chart of a method for manufacturing a bracket in accordance with the present invention.

FIG. 10 is a flow chart illustrating a method for manufacturing brackets that have the advantage of being more resistant to potentially damaging applied forces. At step 70, a predetermined shape is formed, where the predetermined shape includes a major surface, a first appendage, and a second appendage. The predetermined shape may be similar to that illustrated in FIG. 9. The major surface has a rear face and a front face and extends between a top end and a bottom end with a first side and a second side. The first appendage extends a first predetermined distance outward from the first side of the major surface and is positioned a second predetermined distance from the top end of the major surface. The first appendage is adapted to couple to an expansion card at a point away from the major surface. The first and second predetermined distances are determined to allow the first appendage to couple to a recessed portion of the expansion card, which may be an NLX expansion card.

Apertures may be formed in the major surface to allow for connections to the expansion card from the outside of the computer chassis. In addition to this, screw holes and other modifications to the surface may be made to allow the bracket to couple to the expansion card more effectively.

At step 72, the first appendage is manipulated such that it extends outward from the rear face of the major surface. In this configuration, when the first appendage is coupled to the expansion card, it provides support to the major surface such that the major surface resists applied forces that might normally disfigure or bend the bracket.

At step 74, the second appendage is manipulated such that it extends outward from the front face of the major surface. The second appendage is adapted for coupling the bracket to a computer chassis, and may include screw holes and other adaptations to facilitate the coupling.

When a bracket as described above is coupled to an expansion card for mounting in a computer chassis, another benefit which may be provided by the bracket is improved grounding of the expansion card. If the bracket is made out of metal or another conductive material, it can serve as a conductor between the expansion card and a grounded point that is coupled to the bracket. For example, if the bottom end of the bracket is mounted into a portion of the chassis which is grounded, the appendage which extends outward from the rear face of the bracket can provide improved grounding to a recessed location on the expansion card. This can help reduce noise or other problems hat are often associated with high-frequency circuits.

The bracket discussed above allows an NLX format expansion card to be used in an ATX format chassis. In order to allow users maximum flexibility, an expansion card manufacturer can include a bracket as described above along with a bracket that allows the expansion card to be mounted in an NLX chassis when the manufacturer packages the expansion card. The user can then determine which type of chassis the expansion card will be mounted in, and couple the appropriate bracket to the expansion card. By providing both brackets with the expansion card, a single expansion card will have the ability to function in either one of the two formats.

It should be understood that the implementation of other variations and modifications of the invention in its various aspects will be apparent to those of ordinary skill in the art, and that the invention is not limited by the specific embodiments described. For example, the appendage that provides support to the primary surface of the bracket may be multiple appendages that are coupled to the expansion card. It is therefore contemplated to cover by the present invention, any and all modifications, variations, or equivalents that fall within the spirit and scope of the basic underlying principles disclosed and claimed herein.

What is claimed is:

1. A bracket for mounting a expansion card in a computer chassis, the bracket comprising:
    a primary surface having a rear face and a front face, the primary surface extending between a top end and a bottom end, the front face adapted to be aligned against a first surface of the computer chassis; and
    a first appendage extending outward from the rear face of the primary surface and adapted to couple to a recessed portion of the expansion card, the first appendage having a proximal end at the rear face of the primary surface and a distal end opposite the proximal end, the distal end adapted for coupling the first appendage to the recessed portion of the expansion card.

2. The bracket of claim 1, wherein the primary surface is a generally rectangular planar surface.

3. The bracket of claim 1 further comprises a second appendage extending outward from the front face of the primary surface at the top end of the primary surface, the second appendage adapted for coupling the bracket to the computer chassis.

4. The bracket of claim 3, wherein the bottom end of the primary surface is adapted for mounting the bracket to a base portion of the computer chassis.

5. The bracket of claim 4, wherein the primary surface includes an aperture proximate to the top end of the primary surface, the aperture adapted such that a connector of the expansion card is accessible from outside the computer chassis.

6. The bracket of claim 5, wherein the first appendage extends outward from the rear face of the primary surface such that the first appendage is nearly perpendicular to the primary surface.

7. The bracket of claim 6, wherein the first appendage extends outward from the rear face of the primary surface from a first side of the primary surface, wherein the first side runs between the top end and the bottom end along a side of the primary surface.

8. The bracket of claim 7, wherein the first appendage extends outward from the rear face of the primary surface from a recessed notch along the first side.

9. The bracket of claim 7, wherein the proximal end of the first appendage is positioned at a predetermined distance from the top end of the planar primary surface, wherein the predetermined distance is adapted to allow the first appendage to couple to the recessed portion of the expansion card.

10. The bracket of claim 9, wherein the first appendage is structured to provide support to a lower portion of the primary surface of the bracket, wherein the support provided causes the lower portion to resist bending away from a plane generally formed by the primary surface.

11. The bracket of claim 10, wherein the predetermined distance is adapted to couple the first appendage to the recessed portion of the expansion card, wherein the expansion card is an NLX expansion card.

12. The bracket of claim 1, wherein the first appendage is a generally rectangular planar primary surface.

13. The bracket of claim 12, wherein the first appendage includes an aperture at the distal end adapted for coupling the first appendage to the expansion card using a screw.

14. The bracket of claim 1, wherein the primary surface and the first appendage are formed from a single piece of metal, wherein a bend is formed at the proximal end of the first appendage in order to extend the first appendage outward from the rear face of the primary surface.

15. The bracket of claim 1, wherein the first appendage of the bracket is adapted to coupled to a recessed portion of an NLX expansion card, wherein the bracket enables the NLX expansion card to be mounted into an ATX computer chassis.

16. A method for manufacturing a bracket, the method comprising:
    forming a predetermined shape which includes:
        a major surface having a rear face and a front face, the major surface extending between a top end and a bottom end within a first side and a second side; and
        a first appendage extending outward from the first side, wherein the first appendage extends a first predetermined distance from the first side, wherein the first appendage is positioned a second predetermined distance from the top end of the major surface, wherein the first predetermined distance and the second predetermined distance are such that the first appendage is adapted for coupling to a recessed portion of an expansion card; and
    manipulating the first appendage such that the first appendage extends outward from the rear face of the major surface such that when coupled to the expansion card, the first appendage provides support to the major surface.

17. The method of claim 16 further comprises forming the predetermined shape such that the predetermined shape includes a second appendage extending outward from the top end of the major surface; and manipulating the second appendage such that the second appendage extends outward from the front face of the major surface, wherein the second appendage is adapted for coupling the bracket to a computer chassis.

18. The method of claim 17 comprises forming an aperture in the major surface proximate to the top end of the major surface, the aperture adapted such that a connector of the expansion card is accessible from outside of the computer chassis.

19. The method of claim 16, wherein forming the predetermined shape further comprises forming the predetermined shape such that the first predetermined distance and the second predetermined distance enable the first appendage to couple to a recessed portion of an NLX expansion card.

* * * * *